Patented Nov. 21, 1944

2,363,016

UNITED STATES PATENT OFFICE 2,363,016

TREATING SOYBEAN OIL

Paul Oertling, Cleveland, Ohio, assignor to The Glidden Company, Cleveland, Ohio, a corporation of Ohio No Drawing. Application March 12, 1942, Serial No. 434,345

8 Claims. (Cl. 260—404.8)

The present invention relates to the treatment of soybean oil and particularly to a treatment to enhance its use as a drying oil in paints, varnishes and the like.

Soybean oil, while frequently classed as a drying oil, does not possess as good drying and water resistance as such drying oils as linseed oil, Perilla oil, and the like. Soybean oil contains a considerable proportion of combined drying oil acids but it also contains considerable amounts of combined non-drying oil acids, and numerous attempts have been made to improve its drying and water resistance properties.

It is accordingly an object to provide a soybean oil of improved drying and water resistant properties.

Another object is to provide a treatment of soybean oil whereby its drying properties and water resistance are improved.

It has been found that the desired objects may be obtained by heating the soybean oil with glycerine or equivalent polyhydric alcohol such as pentaerythritol, in the presence of a small amount of leaded zinc.

Leaded zinc is a mixture of zinc oxide and basic sulfate white lead and is customarily made by oxidizing a zinc sulfide-lead sulfide ore under controlled conditions to produce zinc oxide and basic lead sulfate which come off as fume and are collected together. The ratio of lead to zinc may vary over a considerable range, and ordinarily is indicated as the percentage of normal zinc sulfate. Thus 35% leaded zinc contains an amount of basic lead sulfate corresponding to 35% normal lead sulfate and the rest is zinc oxide.

For the present invention various leaded zincs may be used. Also other mixtures of zinc oxide and lead sulfate may be used. For best results, however, both lead and zinc should be used. The amount of leaded zinc employed is preferably about ⅛ of 1% by weight of the oil. More than this results in cloudiness although larger amounts produce somewhat better results. Smaller amounts can be used with some improvement in drying and water resistance but not as great as when larger amounts are used.

The amount of glycerine used will preferably be about 20% by weight of the oil. Lesser amounts, unless replaced by equivalent material, do not produce as good results. Larger amounts do not seem to improve the product and when too large amounts are used the water resistance may be decreased. Glycerine may be replaced in whole or in part by other polyhydric alcohols such as pentaerythritol.

The following examples are given by way of illustration.

Example 1

3500 parts of soybean oil and 720 parts of glycerine were heated to 400° F. and 4.25 parts of 35% leaded zinc added. The temperature was slowly raised to 480° F. When the mixture was clear the temperature was raised to 575 for body. The color was 5 as measured by the Hellige Colorimeter and the oil had a Gardner-Holdt viscosity of V. The oil produced was much improved in drying and water resistance. Films dried like linseed oil and the water resistance was as good or better than linseed oil.

Example 2

| | | |
|---|---|---|
| Soya oil | gal | 100 |
| Maleic anhydride | lb | 24 |
| Glycerine | lb | 22 |
| 35% leaded zinc | lb | ⅞ |

The oil and maleic anhydride were heated to 500° F. and the glycerine and leaded zinc were then added. The temperature was held at 500° F. for one hour and then raised to 600° and held for thirty minutes to the desired body. The color was 2-Hellige and the Gardner-Holdt viscosity was F. It is to be noted the amount of glycerine is in excess of that stoichiometrically necessary to neutralize the maleic acid and the oil had better drying and water resistance than a similarly heated oil but without excess glycerine.

Example 3

| | Parts |
|---|---|
| Oil | 4,000 |
| Glycerine | 630 |
| Pentaerythritol | 210 |
| Maleic anhydride | 120 |
| 35% leaded zinc | 15 |

Run oil, glycerine and pentaerythritol to 380° F., add the leaded zinc, gain 500° F.–510° F. and hold approximately 1 hour or until reaction ceases. Then cool to 300° F. add maleic anhydride, gain 580° and hold for desired viscosity.

It is somewhat surprising that glycerine alone when heated with the oil in the presence of the small amount of leaded zinc will result in improved water resistance and drying in view of the hydrophillic nature of the glycerine. There must, therefore, be some reaction which takes place but applicant has no theory as to the nature of this reaction.

Having described the invention what is claimed is:

1. The process which comprises heating soybean oil with up to about 20% of uncombined polyhydric alcohol containing 3 or more hydroxyl groups in the presence of a small amount of a mixture of zinc oxide and lead sulfate.

2. The process which comprises heating soybean oil with up to about 20% of uncombined polyhydric alcohol containing 3 or more hydroxyl groups in the presence of a small amount of leaded zinc.

3. The process which comprises heating soybean oil with about 20% of uncombined polyhydric alcohol containing 3 or more hydroxyl groups in the presence of a small amount of leaded zinc.

4. The process of claim 3 in which the polyhydric alcohol comprises glycerine.

5. The process of claim 3 in which the polyhydric alcohol consists of glycerine.

6. The process of claim 3 in which the polyhydric alcohol consists of a mixture of glycerine and pentaerythritol.

7. The process which comprises heating a major amount of soybean oil with a minor amount of maleic anhydride until the oil is clear, then adding a minor amount of polyhydric alcohol containing 3 or more carboxyl groups in excess of that necessary to neutralize the maleic anhydride, said excess, however, not exceeding about 20% by weight of the oil, and continuing the heating in the presence of a small amount of leaded zinc.

8. The process of claim 7 in which the major amount of the polyhydric alcohol is glycerine.

PAUL OERTLING.